United States Patent [19]

Schneider

[11] Patent Number: 5,063,027

[45] Date of Patent: Nov. 5, 1991

[54] APPARATUS FOR MIXING AT LEAST TWO REACTIVE PLASTIC MATERIALS

[75] Inventor: Fritz W. Schneider, Florence, Ky.

[73] Assignee: Krauss-Maffei A.G., Fed. Rep. of Germany

[21] Appl. No.: 373,015

[22] Filed: Jun. 20, 1989

[30] Foreign Application Priority Data

Jun. 20, 1988 [DE] Fed. Rep. of Germany ....... 3820810

[51] Int. Cl.[5] ............................................... C08F 2/00
[52] U.S. Cl. .................................. 422/133; 366/159; 366/173; 422/131
[58] Field of Search ............... 422/131, 133, 135, 224; 366/137, 159, 173

[56] References Cited

U.S. PATENT DOCUMENTS

| | | |
|---|---|---|
| 3,915,438 | 10/1975 | Weiley, Jr. et al. ................. 422/224 |
| 3,975,128 | 8/1976 | Schüter . |
| 4,115,299 | 9/1978 | Muhle . |
| 4,175,874 | 11/1979 | Schneider . |
| 4,332,335 | 6/1982 | Fiorentini . |
| 4,464,,056 | 8/1984 | Schmitz et al. . |
| 4,473,531 | 9/1984 | Macosko et al. .................... 422/133 |
| 4,490,048 | 12/1984 | Schlueter . |
| 4,497,579 | 2/1985 | Schmitz et al. . |

FOREIGN PATENT DOCUMENTS

| | | |
|---|---|---|
| 0084672 | 8/1983 | European Pat. Off. . |
| 0246535 | 11/1987 | European Pat. Off. . |
| 2145547 | 3/1973 | Fed. Rep. of Germany . |
| 2327269 | 12/1974 | Fed. Rep. of Germany . |
| 2513492 | 10/1976 | Fed. Rep. of Germany . |
| 2645937 | 4/1978 | Fed. Rep. of Germany . |
| 2907938 | 10/1979 | Fed. Rep. of Germany . |
| 3120482 | 1/1983 | Fed. Rep. of Germany . |
| 2022429 | 12/1979 | United Kingdom . |

Primary Examiner—Robert J. Warden
Assistant Examiner—Timothy M. McMahon
Attorney, Agent, or Firm—Robert J. Koch

[57] ABSTRACT

A cylindrical mixing chamber opens into a subsequent cylindrical quieting chamber at an acute angle alpha against its direction of outflow to avoid spattering during the output of a plastic mixture formed of a reactive plastic components from a mixing apparatus.

15 Claims, 3 Drawing Sheets

APPARATUS FOR MIXING AT LEAST TWO REACTIVE PLASTIC MATERIALS

BACKGROUND OF THE INVENTION

1. Field of the Invention

The invention relates to an apparatus for mixing two or more components and more particularly to a method and device for high pressure impingement mixing of two or more reactive components. The components are injected into a mixing chamber containing a reciprocating piston. The mixing chamber opens into a quieting chamber also containing a reciprocating cleaning piston.

2. Description of the Related Technology

The prior art includes devices such as shown in DE P 23 27 269, 25 13 492 and 29 07 938, corresponding to U.S. Pat. Nos. 3,975,128, 4,115,299 and 4,302,910 respectively, the disclosures of which are expressly incorporated herein, where a plastic mixture produced in the mixing chamber is transferred at right angles into the quieting chamber (FIG. 1). In practice the mixed components exit the mixing chamber and spinning flow component may be established in the quieting chamber. Upon the exit of components from the quieting chamber, the spinning action may result in spattering (FIG. 1). The mixhead geometry is extremely significant to the flow characteristics of the mixed components. For many applications a laminar output from the mixing head is absolutely necessary.

SUMMARY OF THE INVENTION

An object of the invention is to insure a laminar outflow of mixed components from the mixhead quieting chamber. A laminar flow of plastic mixture will result if all of the flow components are aligned exclusively coaxially relative to the axis of the quieting chamber.

Another object is to provide a mixing head with a compact configuration. The mixing devices according to the invention may be much slimmer and trimmer than the prior L-shaped mixing devices. A slim configuration is a significant advantage because it allows manipulation of the mixing device over a mold cavity when required for the particular application.

These objects can be achieved according to the invention by arranging the mixing chamber at an acute angle (alpha) to the quieting chamber so that the components undergo a change in direction of over 90 degrees. Advantageously alpha is significantly less than 90 degrees.

The apparatus is for mixing at least two reactive plastic components under high pressure in a cylindrical mixing chamber. The plastic components are injected into the mixing chamber containing a reversible piston. The piston serves to control the flow of the components, i.e., duration of a shot and recirculation, and to clean the chamber by ejection of reactive plastic residues at the end of a shot. A cylindrical quieting chamber follows the mixing chamber and extends at an angle to the longitudinal axis of said mixing chamber. The quieting chamber contains a reversible piston. The mixing chamber and potentially one or more additional mixing chambers are arranged at an acute angle which may be significantly smaller than 90 degrees to the quieting chamber in a direction against the output direction of said quieting chamber. The angle may be within a range of about 30 to 60 degrees and may approximate or be 45 degrees. A reversible or reciprocating mixing chamber piston may exhibit a longitudinal groove for each plastic component defining a recirculation path for the plastic or reactive component involved between two successive injections or shots. The openings of the mixing chambers may advantageously be all located in a common radial plane of the quieting chamber.

It is advantageous to a control a mixing device so that in a first mode of operation (mixing position) the mixing chamber piston releases the injection of the reactive plastic components and the other piston partially closes the outlet opening of the mixing chamber (throttling position). According to an alternative mode of operation the mixing chamber piston may be retracted to release the injection of the reactive plastic components into the mixing chamber and the second piston is retracted to a position past the outlet opening of the mixing chamber so that a swirl or mixing space is formed between the frontal surface of the second piston and the outlet opening of the mixing chamber.

The invention is based on the concept of letting one or several mixing chambers open at an acute angle into the quieting chamber in a direction against or to a degree opposite the output direction of the quieting chamber. Preferably all mixing chambers are arranged in a common radial plane. The component mixture or mixtures introduced into the quieting chamber thereby undergo additional intensive mixing by the reverse flow forced upon them. Simultaneously the generation of a spinning flow in the outlet tube is counteracted.

The invention will become more apparent from the following description with reference to the drawings.

DETAILED DESCRIPTION OF THE PREFERRED EMBODIMENT

Figure 1:
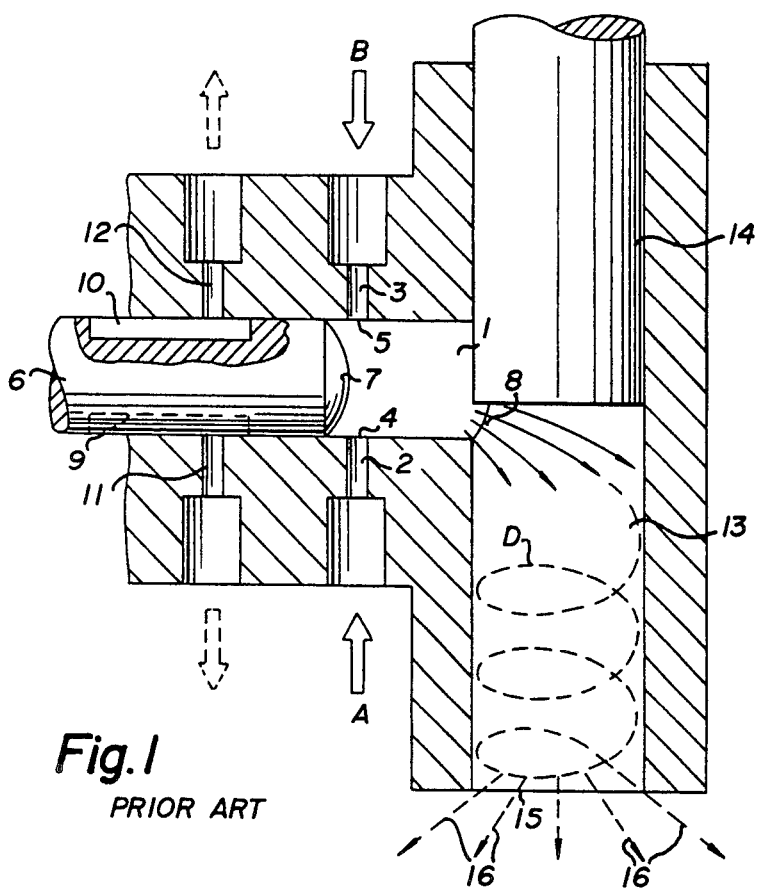
FIG. 1 shows in a schematic view a section through a mixing device with the mixing chamber piston 6 in the mixing position and a quieting chamber 13 located at right angles in a known manner. The quieting chamber piston 14 is in the throttle position.

The partial view shown in FIG. 1 of a known mixing head contains a cylindrical mixing chamber 1. A component inlet line 2 for a plastic or reactive component A and a component inlet line 3 for a plastic or reactive component B open into the mixing chamber. The injection orifices 4 and 5 of these component inlet lines 2 and 3 are opened and closed by the mixing chamber piston 6. The piston is guided reversibly or reciprocates in the mixing chamber. The mixing chamber piston 6 is in the mixing position, in which the injection orifices 4 and 5 are open, so that the plastic components A and B meet at high pressure and are mixed intensively. In a recirculating position (not shown) the mixing chamber piston is in an advanced position in which its frontal surface 7 closes the outlet opening 8 of the mixing chamber 1 in a flush manner. When the mixing piston is advanced, the component inlet lines 2 and 3 are connected to or in communication with component return lines 11 and 12 through the recirculating grooves 9 and 10 provided in the mixing chamber piston 6. The components A and B are returned into tanks or reservoirs in the nonmixing or recirculating position. In the mixing phase shown in FIG. 1 the reactive plastic mixture enters the quieting chamber 13 through the outlet opening 8 after a right angle deflection from the mixing chamber 1. A second reciprocating piston 14 is located in the quieting chamber. The piston 14 is shown in a throttling position partially covering the outlet opening 8. The plastic mixture exits at right angles from the mixing chamber in both a throttling and a completely open position of the piston 14 and impacts the wall opposite the outlet opening 8 of the quieting chamber 13. The mixture may tend to continue in a spinning flow D, whereby the flow of the plastic spreads out upon leaving the outlet opening 15 of the quieting chamber 13, thereby producing a spray (arrows 16). This spraying is particularly undesirable in the molding of plastic mixtures or polyurethane foam in open molds, as this may result in the formation of unacceptable air inclusions or bubbles in the finished product.

Figure 2:
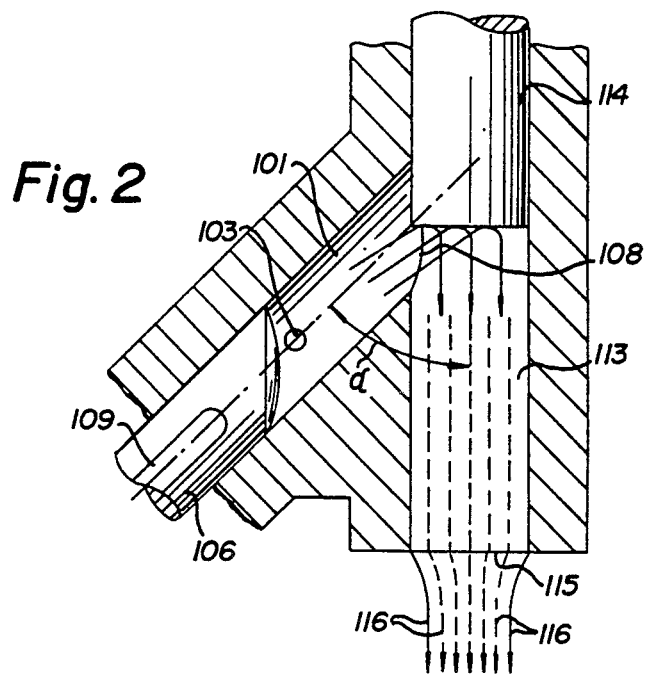
FIG. 2 shows a schematic view a section through a mixing chamber located according to the invention at an acute angle to the quieting chamber, with the cleaning or quieting piston in the throttling position.

The above described problems of the devices according to the previous state of the art (FIG. 1) are eliminated by locating a mixing chamber 101 at an acute angle alpha (FIG. 2), as the plastic mixture leaving the mixing chamber 101 flows initially at this acute angle alpha against the outflow direction of the subsequent quieting chamber 113 and is aligned by reversal and flowthrough into a laminar flow of the plastic mixture. A quieted flow with flow components coaxial relative to the axis of the quieting chamber 113 (arrows 116) appears at the outlet opening 115 of the quieting chamber 113. Air inclusions due to a spray flow, as indicated in FIG. 1 by the arrows 16, can be largely avoided. Further, a mixing device with such a "y" configuration allows ease of manipulation which may be important for many applications. This is particularly so in open mold applications where maneuverability of the mixing device before, during and after a pour may be required. Maneuvering ease of the mixing device between mold parts may be greatly enhanced by the slim "y" configuration.

Figure 3:
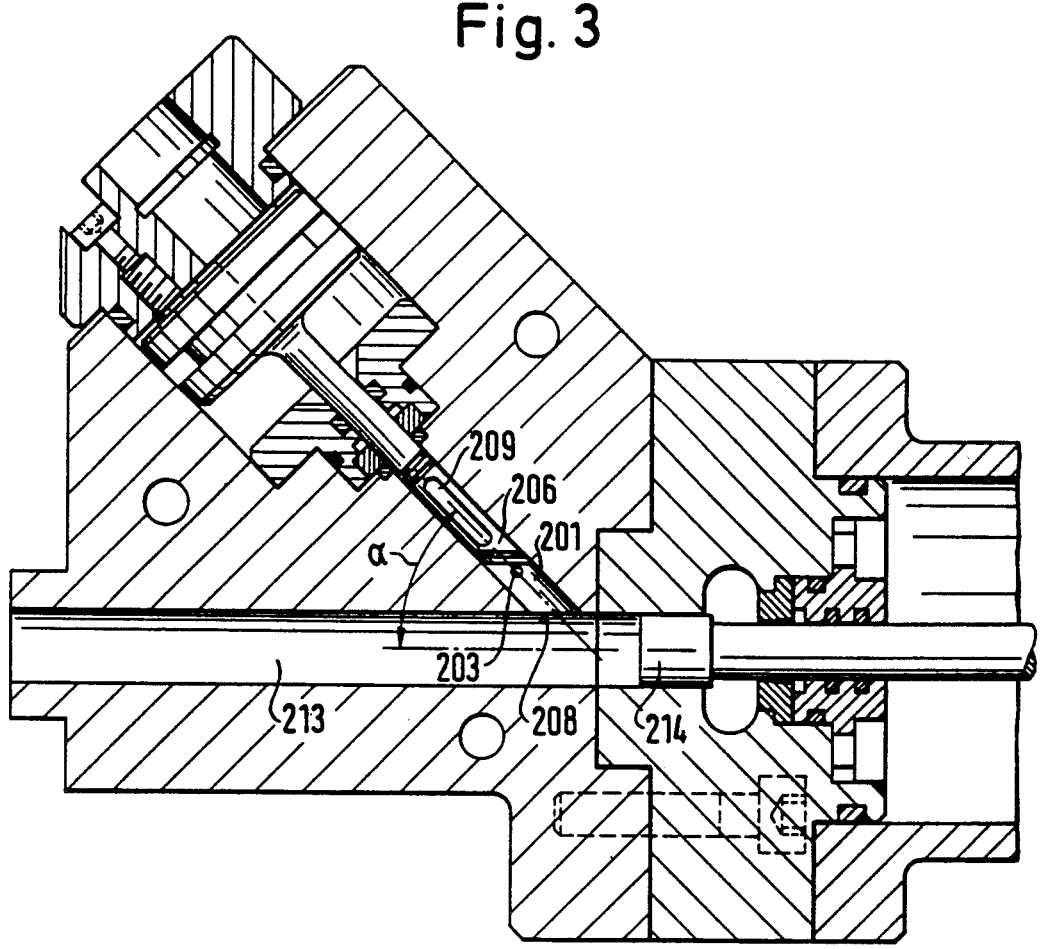
FIG. 3 shows a section through an apparatus according to the invention, with the mixing chamber piston in the mixing position and the quieting chamber piston in a position retracted past the outlet opening of the mixing chamber.

FIG. 3 shows the apparatus according to the invention in the mixing position with a piston 214 further retracted over the outlet opening 208 of the mixing chamber 201. The space vacated by the retracted piston leaves a significantly larger swirlingspace between the frontal surface of the piston 214 and the outlet opening 208 relative to the configuration shown in FIG. 2 where the quieting chamber piston is aligned in a throttling position. The piston 206, located reversibly in the mixing chamber 201, is rotated 90 degrees compared to the embodiment according to FIG. 1, so that only one recirculating groove 209 is visible. A corresponding recirculating groove is located opposite to groove 209. Similarly, in the view according to FIG. 2 and 3 only one injection orifice 103 or 203 is visible.

Figure 4:
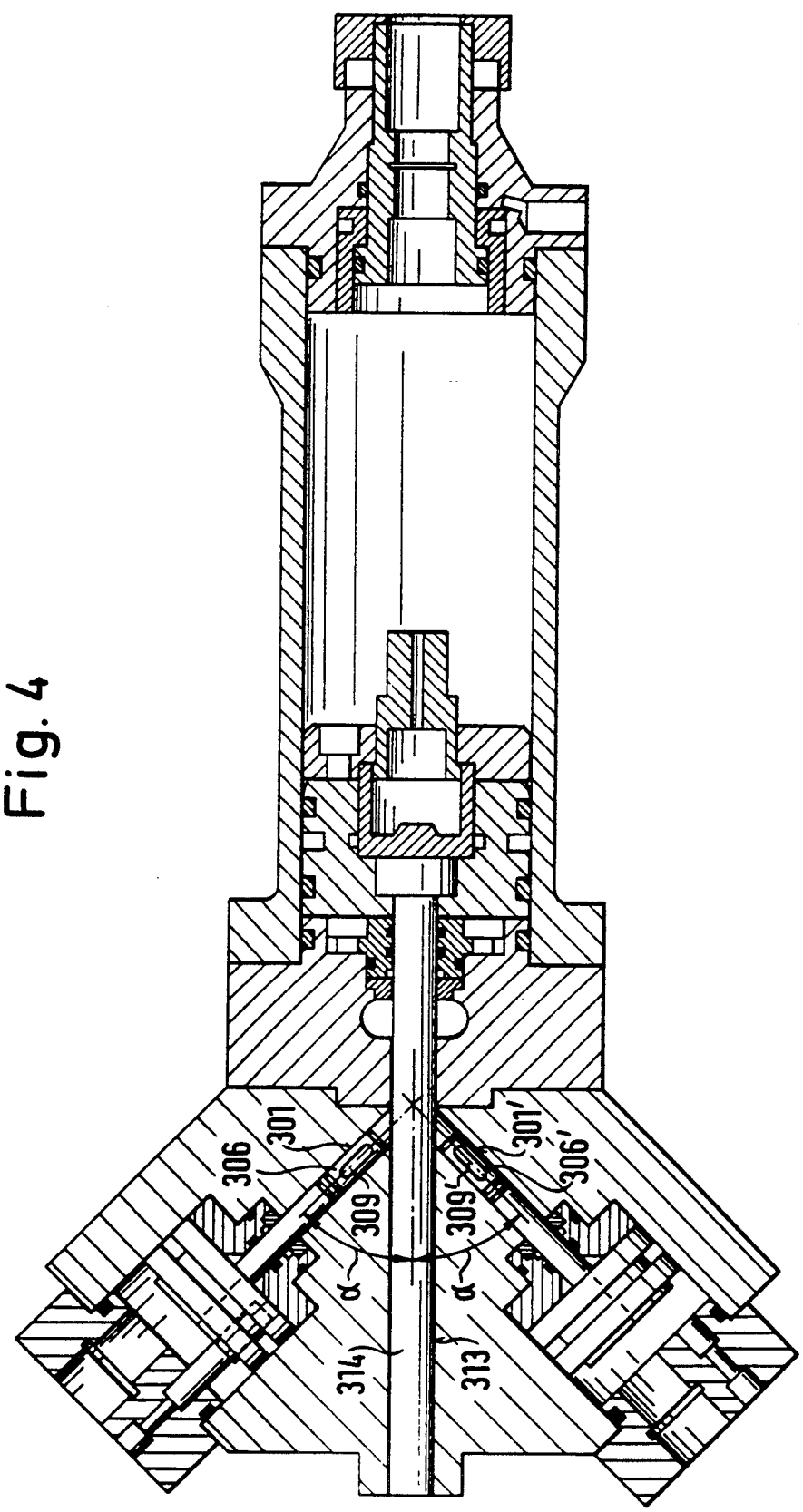
FIG. 4 shows a section through an apparatus according to the invention with two mixing chambers opening at an acute angle into a quieting chamber.

FIG. 4 shows a mixing apparatus in a nonmixing phase. Two mixing chambers 301 and 301' open into a quieting chamber 313. Pistons 306 and 306' are reciprocal in the chambers 301 and 301'. The pistons are shown in the closed or recirculation position, in which the plastic components A and B (FIG. 1) are returned through the recirculating grooves 309 and 309' and the opposing recirculating grooves (not shown) into respective component tanks. The piston 314 located in the quieting chamber 313 is in the foremost or advanced position, in which the plastic mixture, initially put out from the mixing chambers 301 and 301' and ejected by the pistons 306 and 306' in a cleaning stroke, is removed from the quieting chamber 313 at the end of a completed shot.

What is claimed is:

1. An impingement mixing device comprising:
   a mixing chamber housing;
   a control piston axially displaceable within said mixing chamber housing between an extended position and a retracted position;
   a mixing chamber within said housing defined by an end face of said control piston when in the retracted position and a mixing chamber discharge outlet coextensive with an end face of said control piston when in the extended position;
   means for feeding a first component to said mixing chamber;
   means for feeding a second component to said mixing chamber in opposing relationship to said first component; and
   a discharge tube housing defining a quieting chamber communicating with said mixing chamber and having an opening at a discharge end, wherein said mixing chamber is arranged with a longitudinal axis at an acute angle, alpha, to a longitudinal axis of said quieting chamber.

2. An impingement mixing device according to claim 1 wherein said angle is in a range from about 30 to 60 degrees.

3. An impingement device according to claim 1, wherein said angle is in a range between 30 and 60 degrees.

4. An impingement mixing device according to claim 3, wherein said angle is 45 degrees.

5. An impingement mixing device according to claim 1, further comprising a first component recirculation return line disposed in said mixing chamber housing;
   second component recirculation return line in said mixing chamber housing;
   first passage establishing fluid communication between said means for feeding a first component and said first component recirculation return line when said control piston is in the extended position; and
   second passage establishing fluid communication between said means for feeding a second component and said second component recirculation return line when said control piston is in the extended position.

6. An impingement mixing device according to claim 5 further comprising a quieting chamber piston, axially displaceable in said quieting chamber between an extended position and a retracted position for at least partially permitting communication between said mixing chamber and said quieting chamber and cleaning said quieting chamber.

7. An impingement mixing device according to claim 5 wherein said first passage and said second passage comprise grooves in said control piston.

8. An impingement mixing device according to claim 6 wherein said angle is between 30 and 60 degrees.

9. An impingement mixing device according to claim 1 wherein said first and second means for feeding are adapted to inject said first and second components into said mixing chamber in opposing and impinging jets.

10. An impingement mixing device according to claim 8 wherein volume of said quieting chamber is greater than volume of said mixing chamber.

11. An impingement mixing device according to claim 1 wherein said mixing chamber housing and said discharge tube housing are a single unitary housing body.

12. An impingement mixing device according to claim 1 further comprising:
- a plurality of control pistons axially displaceable within said mixing chamber housing between extended positions and retracted positions;
- a plurality of mixing chambers within said housing each defined by an end face of a control piston when in the retracted position and a mixing chamber discharge outlet coextensive with an end face of said control piston when in the extended position;
- two or more material input ducts opening into each mixing chamber;
- wherein all of said mixing chambers are arranged at acute angles to said quieting chamber.

13. An impingement mixing device according to claim 12 wherein said acute angles are between 30 and 60 degrees.

14. An impingement mixing device according to claim 13 wherein said acute angles are 45 degrees.

15. An impingement mixing device according to claim 6 wherein said quieting chamber piston is configured to retract beyond said mixing chamber discharge outlet, wherein a swirling space is defined in said quieting chamber between an end face of said quieting chamber piston and said mixing chamber discharge outlet.

* * * * *